(No Model.) 3 Sheets—Sheet 2.
A. G. WATERHOUSE.
ELECTRIC METER.
No. 464,683. Patented Dec. 8, 1891.
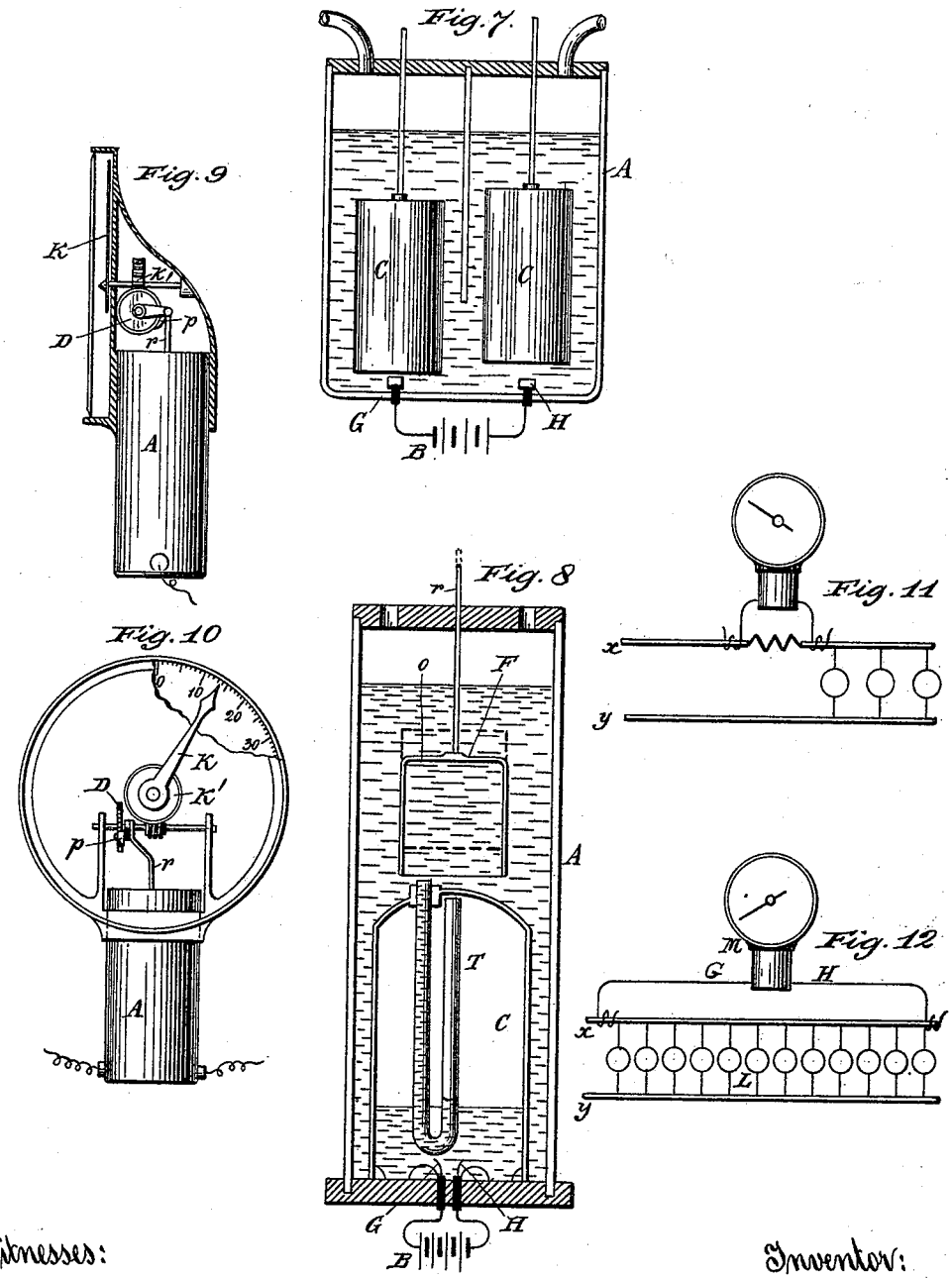

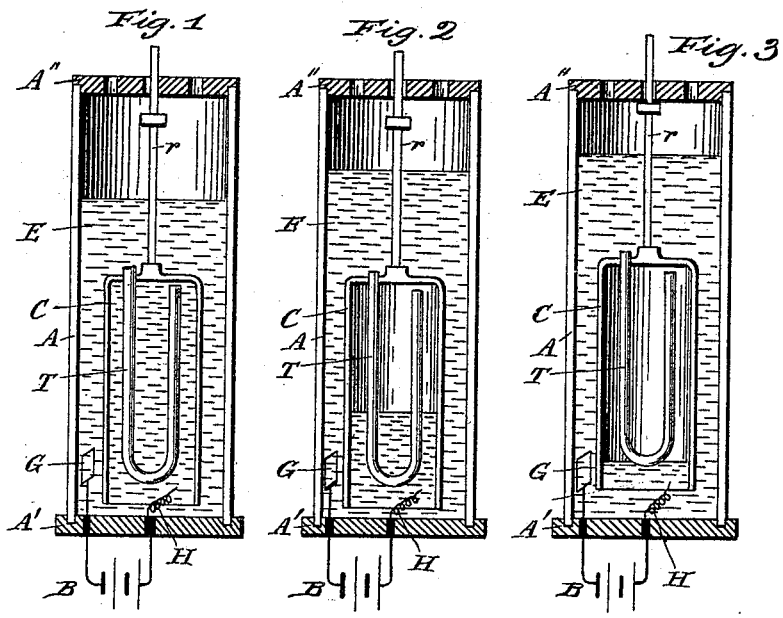
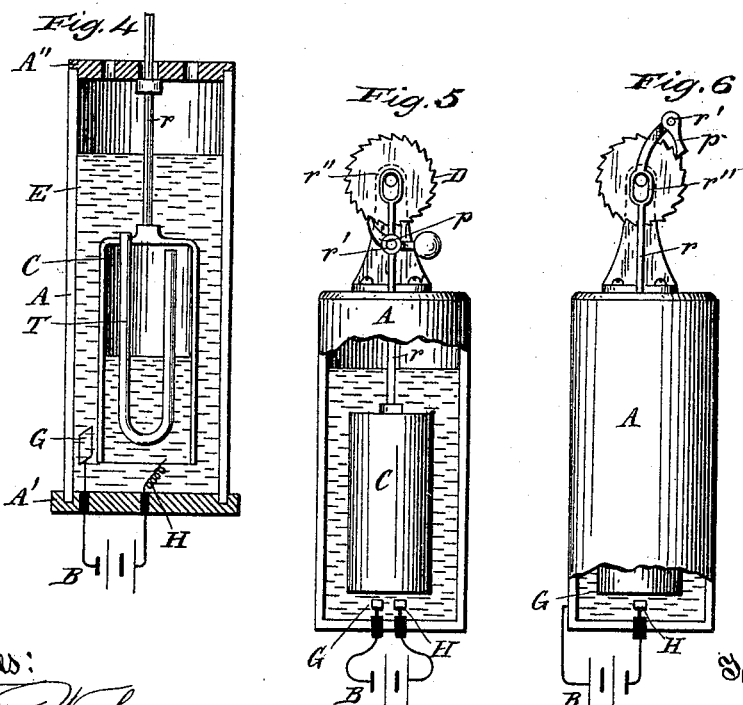

(No Model.)  3 Sheets—Sheet 3.
A. G. WATERHOUSE.
ELECTRIC METER.
No. 464,683.  Patented Dec. 8, 1891.
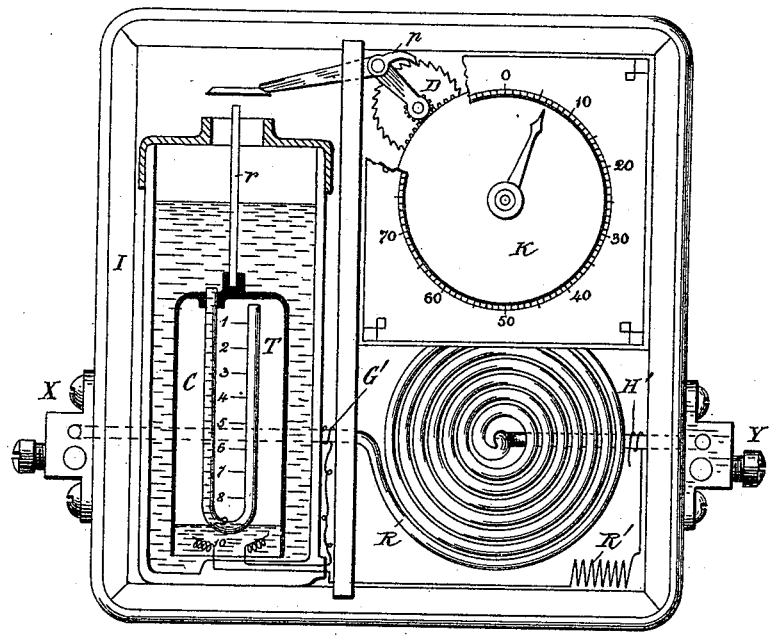
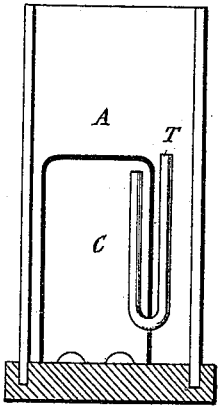
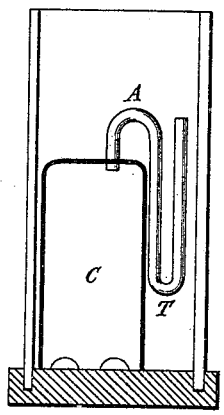
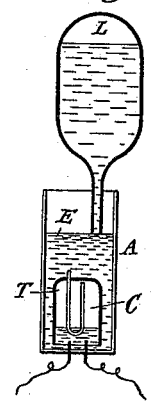
Witnesses:
Walter W. Lovegrove
Frank G. Waterhouse
Inventor:
Addison G. Waterhouse

UNITED STATES PATENT OFFICE.

ADDISON G. WATERHOUSE, OF HARTFORD, CONNECTICUT.

ELECTRIC METER.

SPECIFICATION forming part of Letters Patent No. 464,683, dated December 8, 1891.

Application filed April 10, 1891. Serial No. 388,407. (No model.)

*To all whom it may concern:*

Be it known that I, ADDISON G. WATERHOUSE, a citizen of the United States, residing at the city of Hartford, in the State of Connecticut, have invented new and useful Improvements in Electric Meters, of which the following is a specification.

The object of my invention is for measuring the electrical energy passing through a conductor during a known period, and belongs to that class of electric meters known as "electro-chemical meters," or those in which the current passing is registered by the electrolytic decomposition of certain fluids, whereby gases are generated in proportion to the quantity and duration of such currents, as will be hereinafter described.

In the accompanying drawings, Figures 1, 2, 3, and 4 show the same apparatus embodying my invention in different stages of action. Figs. 5 and 6 show two forms of similar apparatus provided with means of producing mechanical movement. Figs. 7 and 8 are modified forms of the same apparatus. Figs. 9 and 10 show a side and front elevation of the same apparatus provided with a multiplying-gear and recording-dial. Figs. 11 and 12 show electrical connections and methods of applying my invention to the measurement of currents. Fig. 13 shows a practical instrument embodying my invention. Figs. 14 and 15 show equivalent forms of the part of the apparatus shown in Fig. 1. Fig. 16 shows an electrolytic jar A with an atmospheric water-feeder, which replenishes the electrolyte as it evaporates and avoids the necessity of adding too much water to the solution at one time.

My invention consists of an apparatus consisting, first, of an electrolytic cell containing a liquid which permits a current to pass through it only by means of the decomposition of such liquid or electrolyte and with conductors and electrodes leading to the electrolyte; second, a peculiar gas-receiver which is capable of collecting and retaining the gas or gases liberated by the current and of expelling such gas or gases when a certain quantity of the same has been collected; third, of accessory means of recording the amount of gas collected and of electrical conductor and connections through which the current to be measured is passed.

Fig. 1 shows the electrolytic cell A, containing the fluid E, which may be composed of acidulated water or other suitable solution; also the collector C, shaped like an inverted cup. This cup has a guide-rod $r$ and a siphon T, which is secured in the collector C, so that one end of the tube T will extend out at the top of C, while the other end will open inside collector C near the top of the interior, while the bend of the tube T extends down to near the lower part or opening of C. Directly under the collector C is placed one of the electrodes H, while the other electrode G, which belongs to the battery or source of energy B is placed one side, so that the gas arising from G will pass up through the fluid E and out through the top A'' of the jar A, and the gas rising from electrode H will pass up into the collector C and be confined there by the air-tight top of C. Fig. 1 shows C to be filled with the fluid E and the gas just beginning to rise from H and enter at the bottom of C and rise to the top of C, where it will be confined.

Fig. 2 is the same apparatus as Fig. 1; but it shows that gas has been collected in C until it has displaced part of the fluid and also displaced the fluid in the arm of the tube T, which opens inside of C.

Fig. 3 shows the same apparatus again; but in it the gas has increased and displaced more liquid, and by the lightness of the gas it has floated the collector C up so that the collar $w$ on rod $r$ will strike against the cover A''. The gas in C has also displaced the fluid in the tube T until it has forced it down to the lower part or bend of the tube. This displacement will continue until a globule of gas forces itself past the bend, when by gravitation it floats up the arm of the tube leading through the top of C. This gas passing up through T, will reduce the specific weight of same by removing the fluid which fills that arm of the tube. The result is the pressure which the surrounding fluid in A exerts on the gas in C forces the remaining fluid all out of the tube T and after it will follow all the gas in C, as seen in Fig. 4, which shows the gas rushing through the tube T and out through the top of C with a force equal to that which is due from the pressure of the fluid E. So in this way all the gas passes out of C, and as C loses the buoyancy due to the lightness of the gas, the collector C will again sink to the bottom of the jar A, as shown in Fig. 1, when the refilling will again resume, which will result, as stated, in the collector C being filled with gas, floated up, emptied, and sunk again, and so the action will be repeated at intervals which will vary exactly in proportion to the current generated by B or passed through the electrolyte, as described.

Fig. 5 shows a means of employing the described up-and-down motion of C for rotating a recording-wheel D by means of the pawl $p$, which is pivoted to the rod $r$, so that as the collector C and rod $r$ move up it will cause the pawl $p$ to engage in one of the teeth of wheel D and cause it to rotate one tooth each time C is filled with gas.

Fig. 6 shows a similar mechanism, by which the wheel D is rotated one tooth by means of the pawl $p$ each time the collector C sinks. Either of these motions may be made use of to record the number of times C has been filled with gas.

Fig. 7 shows two collectors C C, placed in a single electrolytic jar A, with one of the two electrodes G and H placed under each collector.

Fig. 8 is a form in which the collector C is fixed stationary and arranged to fill with gas and discharge the gas, as described. When the gas is being discharged from C, it floats up under the bell F and displaces the fluid from its interior and floats the bell F up, as shown in dotted lines. This raises the rod $r$, which is attached to the bell. When the gas has been emptied from C and the upward flow of gas stops, the gas collected under F slowly leaks out through a very small opening $o$. After the gas in F has leaked out the bell F again sinks and with it the rod $r$ moves down. As I have shown, I cause an up-and-down motion to be performed by the rod $r$ each time the collector C fills with gas, either by having the collector C move or by having it remain stationary and by causing the escaping gas from C to move the rod $r$. The motion of this rod $r$ I use to work a recording mechanism, which will register the number of times the collector C has been filled with gas.

Fig. 9 shows the electrolytic jar A, the rod $r$ extending out of it, as described, which works a lever, having a pawl $p$, engaging the ratchet-wheel D. The rotation of D works a worm which rotates the worm-wheel K', and it revolves the pointer K, fixed in a dial.

Fig. 10 is a face of Fig. 9, showing the jar A, rod $r$, pawl $p$, wheel D, worm and worm-wheel K', and pointer K, placed in the dial-plate.

Fig. 11 shows an electric meter M, which embodies my invention as described, showing one method of measuring a current in and out on the lines $x$ and $y$. This current has to pass through the resistance R; so around R, I connect the meter M, forming a derived circuit around R, which will carry a current through M bearing a known proportion to the current passing through R, and record the same, as described.

Fig. 12 shows the meter connected to the two extremes of wire $x$, so as to record any fall of potential between the two extremes of $x$, which potential will vary according to the current being taken off by lamps L between the two points at which the conductors G and H of M are connected. The ways of applying this meter vary as circumstances will dictate, whether in series, in a derived circuit around a resistance, or work placed in series on the line or otherwise. In case of an alternating current the main current can be used to produce a small secondary current, which will vary with and bear an exact proportion to the main current, and this secondary current can be measured by the meter.

Fig. 13 represents an instrument embodying my invention, consisting of a case or box I, provided with main terminals $x$ and $y$, through which the current to be measured passes. Between $x$ and $y$, and electrically connecting each, is a coiled conductor R, which forms a slight resistance to the current to be measured. Around this resistance is connected at G' and H' the circuit, of which the electrolytic jar A is a part. The current which passes between $x$ and $y$ divides between resistance R and the jar A. The resistance of path R and that of the jar A can be proportioned so that the path of jar A can take one per cent., or any other known proportion of the total current, and this one per cent. being measured by the jar A and recorded by means of the rod $r$, pawl $p$, wheel D, and dial K, will give the measurement of the total current passing through the instrument.

The construction of this instrument is made plain by the drawings, Fig. 13. The two circuits through the instrument from $x$ to $y$ are through the resistance R, which forms the main path. The other path is from H' through the small balancing resistance R' into the jar A, through the fluid, and out through the other terminal and conductor to G', then on the main conductor to terminal $x$. In this instrument is shown a scale of equal parts, as 1 2, &c., on the collector C, which indicates the part of C which is filled with gas during a period less than the time required for C to fill and empty. $n$ is a detail belonging to Fig. 13 and used as a cover for the jar A to keep the fluid from leaking out when the instrument is not in use.

Fig. 14 shows an equivalent form of constructing the collector C and tube T with one arm of the tube inside and the other outside of C, and Fig. 15 shows both arms of tube T outside of collector C.

Fig. 16 shows an electrolytic jar A with an automatic water-feed L in the form of an inverted bottle, in which water is confined by atmospheric pressure. This is an old device, the water being held in L until air is allowed to enter, when the water flows into the jar A until it rises therein sufficiently to close the mouth of L, which prevents any more water escaping from L until after the surface of the liquid in A recedes sufficiently to allow more air to enter L, when more water is allowed to escape, as above. The advantage of this device, combined with the form of meters above described, is that it replenishes the liquid in the jar in a gradual way, thereby maintaining an even depth and keeping the strength of the solution in A uniform.

As my invention is adapted for a current-meter applicable for either continuous, intermittent, or alternating currents, I have shown different ways of collecting the gases or ions rising from the electrodes—as, for instance, with an alternating current or a continuous current, where there is no liability of the current to reverse, the collector C can be made to collect the gas from one electrode, as shown in Figs. 1, 2, 3, 4, 6, and 7, while as in Figs. 5, 8, and 13 the gas from both electrodes may be collected by C. Fig. 6 shows the jar A, if made of metal, can be used as one of the electrodes, while the other electrode H can be placed under the collector C.

In speaking of the tube T as a means of employing the difference in the specific gravity between gas and fluid to cause the gas to be expelled from C, I do not confine myself to a tube, as any arrangement of partitions or passages in connection with C, which will effect the same results as tube T, will answer in its place.

What I claim as my invention is—

1. The combination, in an electrical meter, of a vessel adapted to hold a fluid electrolyte provided with electrodes, a gas-collector placed over one or both of said electrodes, said collector being provided with a tube or gas-passage leading from the upper interior of the gas-collector, having the elements within itself for discharging the gas from the collector after a certain amount has been collected, substantially as and for the purposes set forth.

2. An electric meter composed of an electrolytic jar, in combination with a gas-collector having a tube leading from the upper interior of the collector and leading down to a level near its bottom opening, then up to near the level of the top of the collector, when it opens outside of the collector, substantially as and for the purposes set forth.

3. The combination, in an electrical meter, of a vessel adapted to hold a fluid electrolyte, a gas-collector for holding a certain quantity of gas, provided with an inverted-siphon tube as a means for discharging the accumulated gas from the said collector, substantially as and for the purposes set forth.

4. An electric meter consisting of an electrolytic jar having the following instrumentalities: a gas-collector for collecting the gas or gases arising from one or both of the electrodes, a U-shaped tube by means of which the gas is discharged from the collector after it has accumulated, so as to displace the fluid from one arm of the said tube, and a recording mechanism actuated by a movement produced by the buoyancy of the accumulated gas or gases, corresponding to the periodical discharges or said gas or gases, substantially as and for the purposes set forth.

5. In an electric meter, a gas-collector C in the form of an inverted cup submerged in a fluid, in combination with a tube T for employing the difference between the specific gravity of gas and fluid to cause the gas to be expelled from the said gas-collector, substantially as and for the purposes set forth.

6. The combination, in an electrical meter, of a vessel adapted to hold a fluid electrolyte, electrodes which form a passage for the current through said electrolyte, a gas-collector adapted for collecting the gas arising from one or both of said electrodes, a gas-passage or discharge-tube leading from the upper interior of said gas-collector, having the means of discharging the gas from the interior of said collector after a certain amount has accumulated, a rod or connection extending from the said collector and leading to a recording mechanism, provided with a rotating dial adapted for indicating the times that the accumulation and discharge of gas has floated and sunk the said collector, and electrical connections leading to the said electrodes, which form a path around a resistance adapted for carrying the current to be measured, substantially as and for the purposes set forth.

ADDISON G. WATERHOUSE.

Witnesses:
JOHN H. GRAHAM,
JAMES P. POLAND.